(12) United States Patent
Sawada et al.

(10) Patent No.: US 7,408,308 B2
(45) Date of Patent: Aug. 5, 2008

(54) LED DRIVE CIRCUIT, LED LIGHTING DEVICE, AND BACKLIGHT

(75) Inventors: Shinichi Sawada, Niigata (JP); Takayuki Shimizu, Gosen (JP)

(73) Assignee: Sharp Kabushiki Kaisha, Osaka (JP)

( * ) Notice: Subject to any disclaimer, the term of this patent is extended or adjusted under 35 U.S.C. 154(b) by 286 days.

(21) Appl. No.: 11/411,963

(22) Filed: Apr. 27, 2006

(65) Prior Publication Data

US 2006/0255753 A1 Nov. 16, 2006

(30) Foreign Application Priority Data

May 13, 2005 (JP) .............................. 2005-141906

(51) Int. Cl.
*G05F 1/00* (2006.01)
(52) U.S. Cl. ..................... 315/291; 315/169.1; 315/312; 315/276; 327/108; 327/109; 345/46; 345/82
(58) Field of Classification Search ............... 315/169.1, 315/169.3, 291, 307, 276, 278, 312; 327/108–110; 345/44, 46, 82, 83; 340/815.4, 815.45; 250/552; 362/800
See application file for complete search history.

(56) References Cited

U.S. PATENT DOCUMENTS

| | | | | |
|---|---|---|---|---|
| 4,298,869 A | * | 11/1981 | Okuno | .................... 345/82 |
| 6,057,651 A | | 5/2000 | Usami et al. | |
| 6,870,328 B2 | | 3/2005 | Tanabe et al. | |
| 7,115,888 B2 | * | 10/2006 | Hachiya et al. | ............. 250/552 |
| 2004/0155596 A1 | | 8/2004 | Ushijima et al. | |
| 2007/0121349 A1 | * | 5/2007 | Mednik et al. | ........... 363/21.01 |

FOREIGN PATENT DOCUMENTS

| | | | |
|---|---|---|---|
| JP | 56-86495 | A | 7/1981 |
| JP | 59-108297 | A | 6/1984 |
| JP | 8-194448 | A | 7/1996 |
| JP | 11-67471 | A | 3/1999 |
| JP | 2000-12907 | A | 1/2000 |
| JP | 2002-8409 | A | 1/2002 |
| JP | 2004-51014 | A | 2/2004 |
| JP | 2004-253364 | A | 9/2004 |
| JP | 2004-319583 | A | 11/2004 |
| JP | 2004-335443 | A | 11/2004 |
| WO | WO-2004/068909 | A | 8/2004 |

* cited by examiner

*Primary Examiner*—Haissa Philogene
(74) *Attorney, Agent, or Firm*—Birch, Stewart, Kolasch & Birch, LLP

(57) ABSTRACT

To realize an LED drive circuit capable of feeding equal currents to parallel-connected LED circuits with a simple arrangement, there are provided a current source generating a temporally altering current and a first smoothing capacitor and a second smoothing capacitor, and there are also provided: a first LED circuit, containing one LED or series-connected LEDs, which is connected in parallel with the first smoothing capacitor; and a second LED circuit, containing one LED or series-connected LEDs, which is connected in parallel with the second smoothing capacitor, the drive circuit comprising: a current-dividing coil containing two coils coupled at a tap so that the current generated in the current source flows into the tap; a first reverse current blocking diode connected between an end of the current-dividing coil and an electrode of the first smoothing capacitor; and a second reverse current blocking diode connected between another end of the current-dividing coil and an electrode of the second smoothing capacitor.

8 Claims, 10 Drawing Sheets

US 7,408,308 B2

LED DRIVE CIRCUIT, LED LIGHTING DEVICE, AND BACKLIGHT

This nonprovisional application claims priority under 35 U.S.C. § 119(a) on Patent Application No. 141906/2005 filed in Japan on May 13, 2005, the entire contents of which are hereby incorporated by reference.

FIELD OF THE INVENTION

The present invention relates in general to an LED (light emitting diode) lighting device, for example, those used in the backlight of liquid crystal displays, and in particular to a drive (switch-on) circuit (LED drive circuit) for such a device.

BACKGROUND OF THE INVENTION

FIG. 9 is a circuit diagram for a conventional LED lighting device. As shown in the figure, the LED lighting device 801 includes an input power supply Vin (DC power supply), an LED drive circuit, and four LED circuits (803a to 803d). The LED drive circuit includes a PWM control IC 804, a switching element 805, a diode 806, a coil 807, resistors Ra to Rd, and a smoothing capacitor 808. The LED circuit 803a is made up of 10 LEDs connected in series between a node a1 and a node a2. Likewise, the LED circuit 803b is made up of 10 LEDs connected in series between a node b1 and a node b2; the LED circuit 803c is made up of 10 LEDs connected in series between a node c1 and a node c2; and the LED circuit 803d is made up of 10 LEDs connected in series between a node d1 and a node d2. The coil 807 has one of its ends connected to the positive terminal of the input power supply Vin. The other end of the coil 807, the anode of the diode 806, and the first conductive terminal (drain) of the switching element 805 are connected to each other. The control terminal (gate) of the switching element 805 is connected to the PWM control IC 804. The second conductive terminal (source) is connected to the negative terminal of the input power supply Vin. The cathode of the diode 806 is connected to the negative terminal of the input power supply Vin via the smoothing capacitor 808. The cathode of the diode 806, a first electrode of the smoothing capacitor 808, and the nodes a1 to d1 are connected to each other. The nodes a2 to d2 are connected to the negative terminal of the input power supply Vin via the respective resistors Ra to Rd. For example, the node a2 is connected to the negative terminal of the input power supply Vin via the resistor Ra. The node b2 is connected to the negative terminal of the input power supply Vin via the resistor Rb. Accordingly, the LED circuits 803a to 803d are connected in parallel between the cathode of the diode 806 and the negative terminal of the input power supply Vin. In addition, the node a2 is coupled also to a current feedback input of the PWM control IC 804.

The drive circuit provides a step-up converter (boost converter). The circuit accumulates energy in the coil 807 (coil) while the switching element 805 is on and applies electromotive voltage derived from that energy along with input voltage across the smoothing capacitor 808 and the LED circuits 803a to 803d while the switching element 805 is off. The current value through the LED circuit 803a is detected using the resistor Ra to make a current feedback to the PWM control IC 804. Based on the feedback, the duty ratio (on/off ratio) of the switching element 805 is controlled. Thus, the current flow through the LED circuit 803a is made constant.

Note that the LED circuits 803a to 803d are in parallel. Therefore, provided that the LED circuits 803a to 803d share the same forward current-forward voltage characteristic ("IF-VF characteristic"), the currents IFa to IFd through the respective LED circuits 803a to 803d are all constant and equal to each other.

FIG. 11 is a circuit diagram for another conventional LED lighting device. As shown in the figure, the LED lighting device 901 includes an input power supply Vin (DC power supply), an LED drive circuit, and LED circuits 903a to 903d. The LED drive circuit includes PWM control ICs 904a to 904d, switching elements 905a to 905d, diodes 906a to 906d, coils 907a to 907d, smoothing capacitors 908a to 908d, and resistors ra to rd. The LED circuit 903a is made up of 10 LEDs connected in series between a node a1 and a node a2. Likewise, the LED circuit 903b is made up of 10 LEDs connected in series between a node b1 and a node b2; the LED circuit 903c is made up of 10 LEDs connected in series between a node c1 and a node c2; and the LED circuit 903d is made up of 10 LEDs connected in series between a node d1 and a node d2.

Separate the FIG. 11 circuitry into four circuits A, B, C, and D. The circuit A consists of components 903a to 908a and ra. The circuit B consists of components 903b to 908b and rb. The circuit C consists of components 903c to 908c and rc. The circuit D consists of components 903d to 908d and rd. Circuits A to D have the same arrangement and operate in the same fashion.

Take the circuit A as an example. The coil 907a has one of its ends connected to the positive terminal of the input power supply Vin. The other end of the coil 907a, the anode of the diode 906a, and the first conductive terminal (drain) of the switching element 905a are connected to each other. The control terminal (gate) of the switching element 905a is connected to the PWM control IC 904a. The second conductive terminal (source) is connected to the negative terminal of the input power supply Vin. The cathode of the diode 906a is connected to the negative terminal of the input power supply Vin via the smoothing capacitor 908a. The cathode of the diode 906a, a first electrode of the smoothing capacitor 908a, and the node a1 are connected to each other. The node a2 is connected to the negative terminal of the input power supply Vin via the resistor ra. The circuitry accumulates energy in the coil 907a (coil) while the switching element 905a is on and applies electromotive voltage derived from that energy along with input voltage across the smoothing capacitor 908a and the LED circuit 903a while the switching element 905a is off. The current value through the LED circuit 903a is detected using the resistor ra to make a current feedback to the PWM control IC 904a. Based on the feedback, the duty ratio (on/off ratio) of the switching element 905a is controlled. Thus, the current flow through the LED circuit 903a is made constant.

The arrangement allows for individual control of the currents IFa to IFd through the circuits A to D. Therefore, even if the LED circuits 903a to 903d do not have exactly the same forward current-forward voltage characteristic ("IF-VF characteristic"), it is still possible to equalize the current flows through the LED circuits 903a to 903d, hence the emitted light intensity (luminance level) from the LED circuits 903a to 903d.

Related techniques are disclosed in the following publicly known documents: Japanese Unexamined Patent Publication 2004-319583 (Tokukai 2004-319583; published on Nov. 11, 2004), Japanese Unexamined Patent Publication 2002-8409 (Tokukai 2002-8409; published on Jan. 11, 2002), Japanese Unexamined Patent Publication 11-67471/1999 (Tokukaihei 11-67471; published on Mar. 9, 1999), Japanese Unexamined Patent Publication 2004-253364 (Tokukai 2004-253364; published on Sep. 9, 2004), Japanese Unexamined Patent Publication 2004-51014 (Tokukai 2004-51014; published on Feb. 19, 2004), Japanese Unexamined Patent Publication 8-194448/1996 (Tokukaihei 8-194448; published on Jul. 30, 1996), Japanese Unexamined Patent Publication 2000-12907 (Tokukai 2000-12907; published on Jan. 14, 2000), Japanese Unexamined Patent Publication 2004-335443 (Tokukai 2004-335443; published on Nov. 25, 2004), Japanese Unexamined Patent Publication 56-86495/1981 (Tokukaisho 56-86495; published on May 14, 1981), and Japanese Unexamined Patent Publication 59-108297/1984 (Tokukaisho 59-108297; published on Jun. 22, 1984).

Each of the above LED circuits contains 10 series-connected LEDs. These LEDs, although bearing the same product number, may have variations in the forward current-forward voltage characteristic. For example, the VF of LEDs of a specific product number vary from 2.2 volts (minimum) to 2.6 volts (standard) and 3.0 volts (maximum) for the same IF (30 mA) as shown in FIG. 10.

These variations between the LEDs in the forward current-forward voltage characteristic naturally cause variations between the LED circuits containing those LEDs in the forward current-forward voltage characteristic. In other words, in the LED lighting device 801 in FIG. 9, the LED circuits 803*a* to 803*d* do not share the same forward current-forward voltage characteristic ("IF-VF characteristic"). In such situations, the LED circuits 803*a* to 803*d* pass current of different values, hence emit light of different intensities (luminance levels). These defects can cause problems when the device is applied for illumination purposes and to the area light source in the backlight for large-scale liquid crystal displays. Variations in emitted light intensity can be a cause for uneven luminance. Different current values may lead to differing temperature rises and lifetimes. These problems in turn seriously impact product quality.

In contrast, in the LED lighting device 901 in FIG. 11, the LED circuits 903*a* to 903*d* pass current of the same values (IFa to IFd). The device 901 however has disadvantages, such as a high component count, corollary increased chances of malfunction (poor yield), and high manufacturing cost.

SUMMARY OF THE INVENTION

The present invention, conceived in view of these problems, has an objective to realize an LED drive circuit of a simple arrangement capable of feeding equal currents to parallel-connected LED circuits.

An LED drive circuit of the present invention, to address the problems, is an LED drive circuit including a current source generating a temporally altering current and a first smoothing capacitor and a second smoothing capacitor. The LED drive circuit drives: a first LED circuit, containing one LED or series-connected LEDs, which is connected in parallel with the first smoothing capacitor; and a second LED circuit, containing one LED or series-connected LEDs, which is connected in parallel with the second smoothing capacitor. Further, the LED drive circuit includes: a current-dividing coil containing two coils coupled at a tap (an end of each coil is coupled) so that the current generated in the current source flows into the tap; a first reverse current blocking diode connected between an end of the current-dividing coil and an electrode of the first smoothing capacitor; and a second reverse current blocking diode connected between another end of the current-dividing coil and an electrode of the second smoothing capacitor.

According to the arrangement, the temporally altering current generated in the current source flows into the current-dividing coil. Thus, inductive coupling occurs in the current-dividing coil. The incoming current from the current source is divided at the inverse of the ratio of the turns of the two coils regardless of the forward current-forward voltage characteristics of the first and second LED circuits. The divided currents are fed to the parallel-connected smoothing capacitor and LED circuits via the respective reverse current blocking diodes.

Accordingly, the LED circuits carry equal currents even if the first and second LED circuits vary in the forward current-forward voltage characteristics. The arrangement thus addresses variations in light intensity (luminance level) between the LED circuits. The arrangement also addresses different temperature rises and lifetimes due to different current values. The arrangement, which is simple, delivers high quality products at low manufacturing cost. The current-dividing coil may be replaced with a coil made of a single component with a tap.

Additional objects, advantages and novel features of the invention will be set forth in part in the description which follows, and in part will become apparent to those skilled in the art upon examination of the following or may be learned by practice of the invention.

DESCRIPTION OF THE EMBODIMENTS

Embodiment 1

Figure 1:
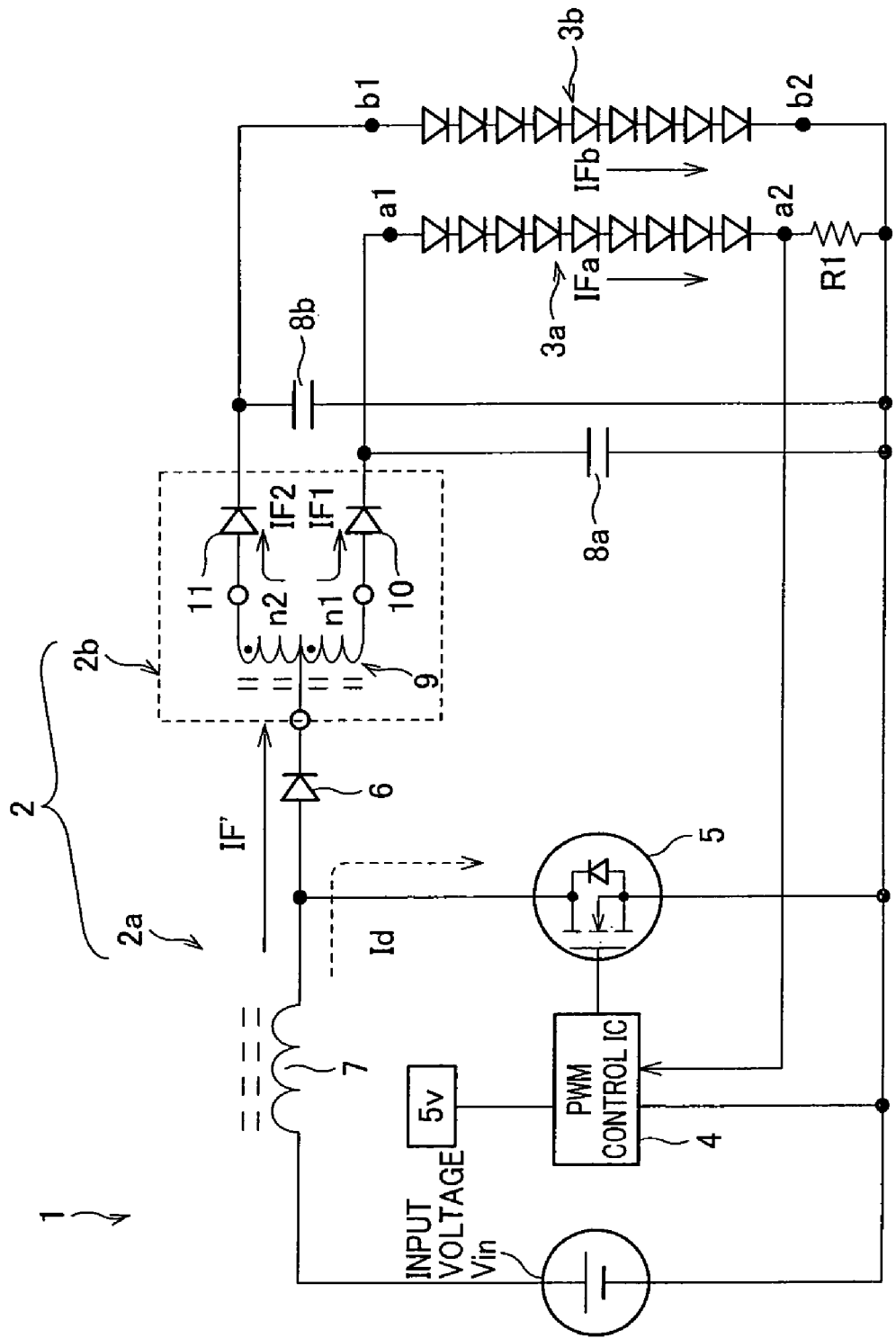
FIG. 1 is a circuit diagram illustrating the circuit arrangement of an LED lighting device for embodiment 1.

The following will describe an embodiment of the LED drive circuit of the present invention. FIG. 1 is a circuit diagram illustrating the arrangement of an LED lighting device for embodiment 1.

As shown in the figure, the LED lighting device 1 contains an input power supply Vin, an LED drive circuit 2, and two LED circuits 3*a* and 3*b*. The LED drive circuit 2 contains a switchable power supply circuit 2*a* and a current-dividing circuit 2*b*. The switchable power supply circuit 2*a*, connected to the input power supply Vin, contains a PWM control IC 4, a switching element 5 (N-channel MOS transistor), a diode 6, a coil 7, smoothing capacitors 8*a* and 8*b*, and a resistor R1. The current-dividing circuit 2*b* contains a current-dividing coil (inductor) 9 and diodes (reverse current blocking diodes) 10 and 11. The current-dividing coil 9 is made up of a winding n1 of n1 turns and a winding n2 of n2 turns, both wound around the same core, which are coupled together at a center tap (relay terminal). The LED circuit 3a is made up of 10 LEDs connected in series between a node a1 and a node a2. Similarly, the LED circuit 3b is made up of 10 LEDs connected in series between a node b1 and a node b2.

In the LED drive circuit 2, the coil 7 has one of its ends connected to the positive terminal of the input power supply Vin. The other end of the coil 7, the anode of the diode 6, and the first conductive terminal (drain) of the switching element 5 are connected to each other. The control terminal (gate) of the switching element 5 is connected to the PWM control IC 4. The second conductive terminal (source) is connected to the negative terminal of the input power supply Vin.

The cathode of the diode 6 is connected to the center tap of the current-dividing coil 9. An end of the current-dividing coil 9 is connected to the anode of the diode 10. The other end is connected to the anode of the diode 11.

The cathode of the diode 10 is connected to the node a1 and, via the smoothing capacitor 8a, to the negative terminal of the input power supply Vin. Similarly, the cathode of the diode 11 is connected to the node b1 and, via the smoothing capacitor 8b, to the negative terminal of the input power supply Vin. Further, the node a2 is connected to a current feedback input of the PWM control IC 4 and, via the resistor R1, to the negative terminal of the input power supply Vin. The node b2 is also connected to the negative terminal of the input power supply Vin. Accordingly, the LED circuits 3a and 3b are connected in parallel between the center tap of the current-dividing coil 9 and the negative terminal of the input power supply Vin.

The switchable power supply circuit 2a provides a step-up converter (boost converter). The circuit accumulates energy in the coil 7 while the switching element 5 is on. While the switching element 5 is off, the circuit supplies, via the diode 6 to the center tap of the current-dividing coil 9, a current IF' generated by electromotive voltage derived from that energy along with input voltage. Due to inductive coupling, divided currents IF1 and IF2 flows through the winding n1 (diode 10) and the winding n2 (diode 11), respectively, of the current-dividing coil 9 in accordance with the inverse of the ratio of the turns of the two coils. Where the ratio of the turns n1:n2=1:1, IF1:IF2=1:1. Where the ratio of the turns n1:n2=2:1, IF1:IF2=1:2.

Figure 2:
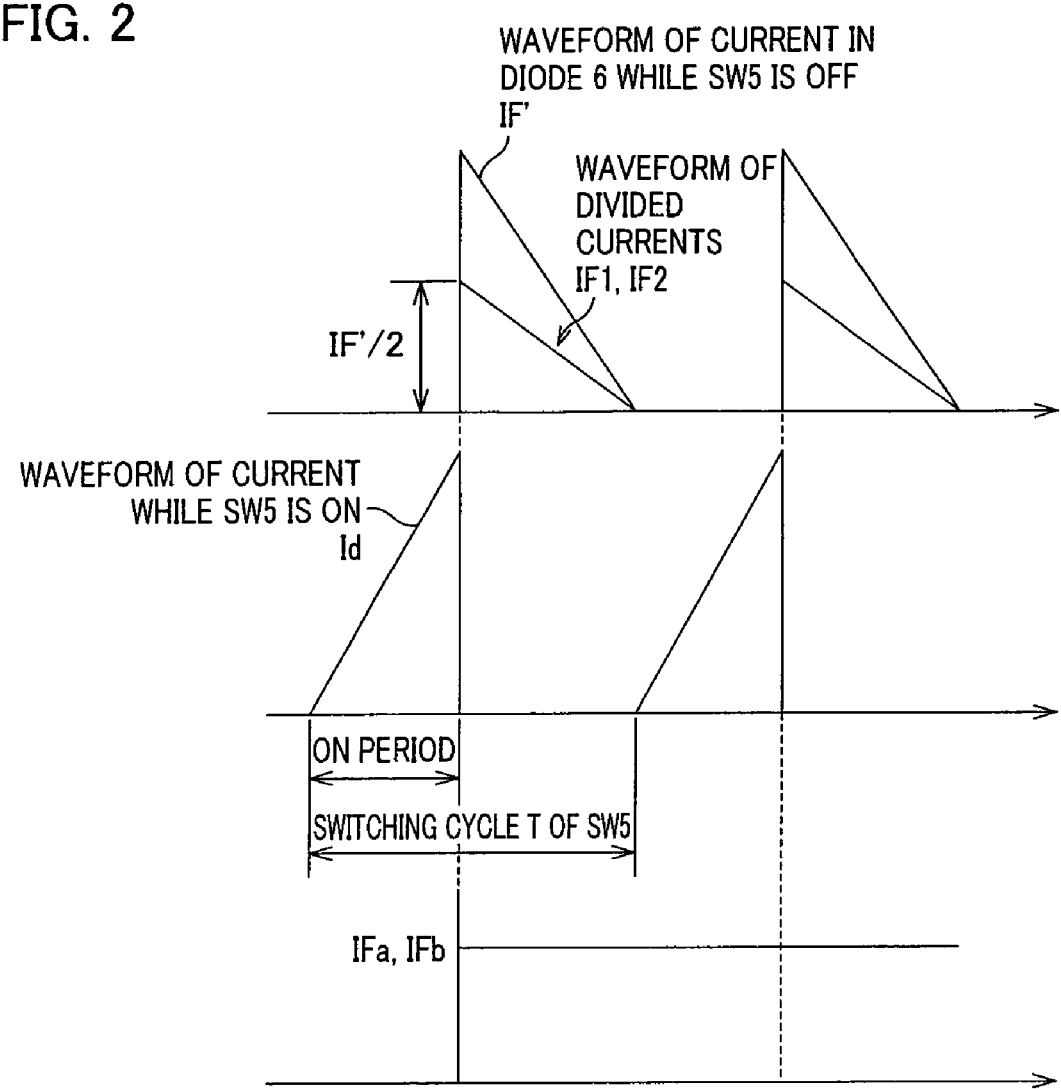
FIG. 2 is a graphical representation of a current flow through the LED lighting device circuitry shown in FIG. 1.

The divided current IF1 passes through the diode 10 of the current-dividing circuit 2b and reaches the smoothing capacitor 8a and the LED circuit 3a. The divided current IF2 passes through the diode 11 of the current-dividing circuit 2b and reaches the smoothing capacitor 8b and the LED circuit 3b. Suppose that the ratio, n1:n2, of the turns is 1:1. When the switching element 5 is turned off, the current IF' (current flow through the diode 6) takes a peak value of Id and decays with time, as shown in FIG. 2, while the switching element 5 is being off. Although the divided currents IF1 and IF2 both decay, smoothed, equal DC constant currents IFa and IFb (see FIG. 2) flow through the LED circuits 3a and 3b due to charge operation of the smoothing capacitors 8a and 8b. While the switching element 5 is being on, the current IF', as well as the divided currents IF1 and IF2, are all zero amperes. However, smoothed, equal DC constant currents IFa and IFb (see FIG. 2) flow through the LED circuits 3a and 3b due to discharge operation of the smoothing capacitors 8a and 8b.

The current value through the LED circuit 3a is detected using the resistor R1 to make a current feedback to the PWM control IC 4. Based on the feedback, the duty ratio (on/off ratio) of the switching element 5 is controlled. This series of actions of the LED drive circuit 2 provides equal currents to the LED circuits 3a and 3b even if the LED circuit 3a and the LED circuit 3b have different forward current-forward voltage characteristics. As discussed above, the LED drive circuit 2 is capable of addressing variations in light intensity (luminance level) between the LED circuits 3a and 3b. The LED drive circuit 2 is also capable of addressing different temperature rises and lifetimes due to different current values. The LED drive circuit 2, which is simple, is capable of delivering high quality products at low manufacturing cost.

Furthermore, the LED drive circuit 2 equalizes the current flows through the LED circuits 3a and 3b, hence the emitted light intensity from the LED circuits 3a and 3b, even if the LED circuits 3a and 3b contain LEDs of different forward current-forward voltage characteristics (for example, different color LEDs) or different numbers of LEDs.

The diode 6 may be omitted with the center tap of the current-dividing coil 9 being directly connected to an end of the coil 7.

Figure 3:
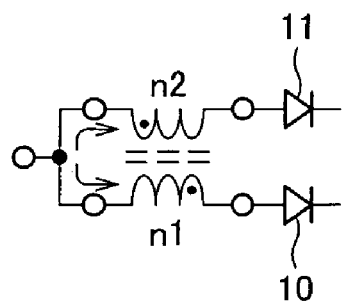
FIG. 3 is a circuit diagram illustrating a variation for a current-dividing circuit in the LED lighting device.

A variation of the current-dividing circuit 2b is shown in FIG. 3. The current-dividing circuit in the LED drive circuit 2 may be two windings of n1 turns and n2 turns wound around the same core as shown in the figure. An end of each winding is coupled to form a center tap. The other ends are connected respectively to the anodes of the diodes 10 and 11.

Embodiment 2

Figure 4:
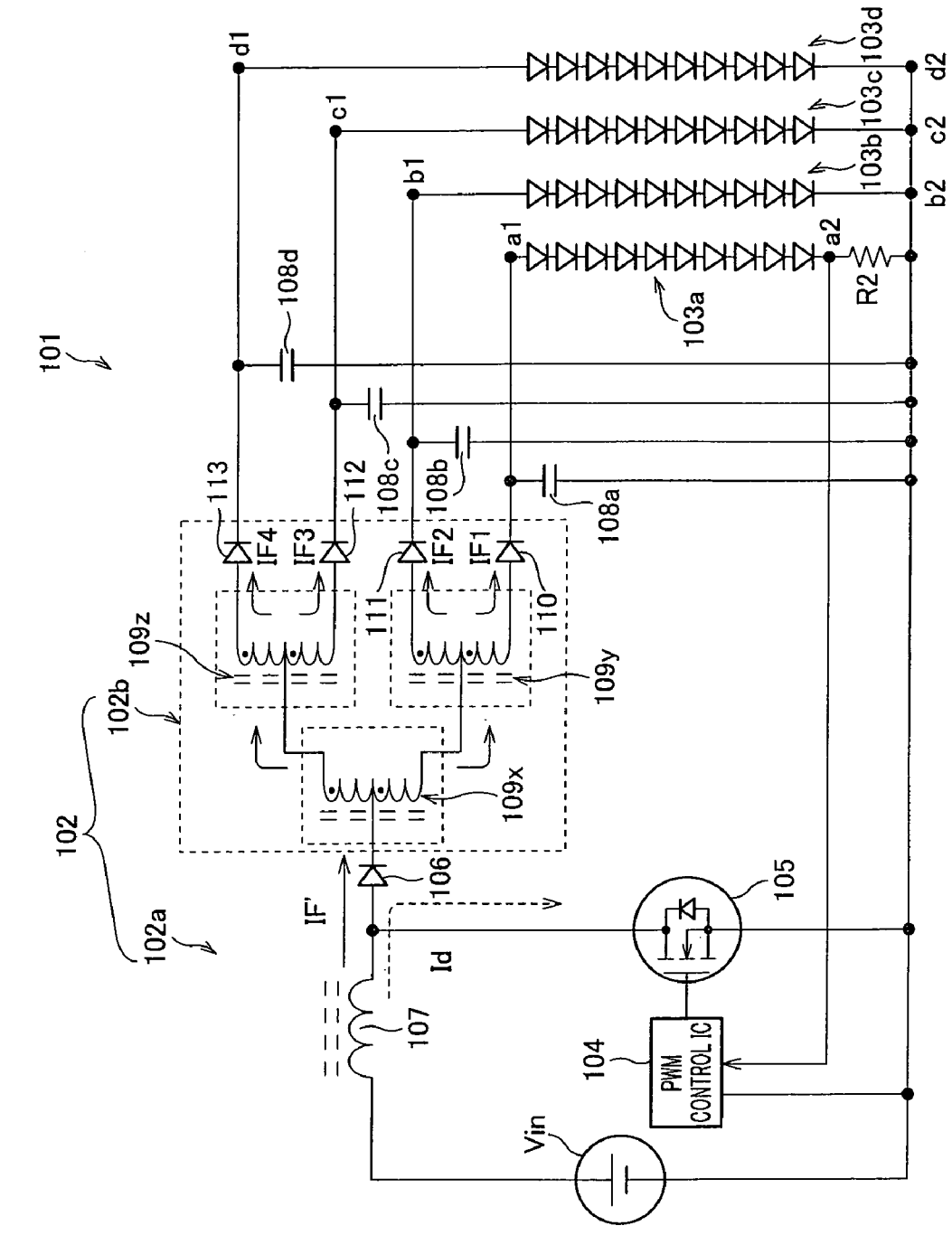
FIG. 4 is a circuit diagram illustrating the circuit arrangement of an LED lighting device for embodiment 2.

The following will describe another embodiment of the LED drive circuit of the present invention. FIG. 4 is a circuit diagram illustrating the arrangement of an LED lighting device for embodiment 2.

As shown in the figure, the LED lighting device 101 contains an input power supply Vin, an LED drive circuit 102, and four LED circuits 103a to 103d. The LED drive circuit 102 contains a switchable power supply circuit 102a and a current-dividing circuit 102b. The switchable power supply circuit 102a, connected to the input power supply Vin, contains a PWM control IC 104, a switching element 105, a diode 106, a coil 107, smoothing capacitors 108a to 108d, and a resistor R2. The current-dividing circuit 102b contains current-dividing coils 109x to 109z and diodes 110 to 113 (reverse current blocking diodes). The current-dividing coils 109x to 109z are each made up of two windings wound around the same core which are coupled together at a center tap. The LED circuit 103a is made up of 10 LEDs connected in series between a node a1 and a node a2. Similarly, the LED circuit 103b is made up of 10 LEDs connected in series between a node b1 and a node b2; the LED circuit 103c is made up of 10 LEDs connected in series between a node c1 and a node c2; and the LED circuit 103d is made up of 10 LEDs connected in series between a node d1 and a node d2.

In the LED drive circuit 102, the coil 107 has one of its ends connected to the positive terminal of the input power supply Vin. The other end of the coil 107, the anode of the diode 106, and the first conductive terminal (drain) of the switching element 105 are connected to each other. The control terminal (gate) of the switching element 105 is connected to the PWM control IC 104. The second conductive terminal (source) is connected to the negative terminal of the input power supply Vin.

The cathode of the diode 106 is connected to the center tap of the current-dividing coil 109x. An end of the current-dividing coil 109x is connected to the center tap of the coil 109y. The other end is connected to the center tap of the coil 109z. An end of the current-dividing coil 109y is connected to the anode of the diode 110. The other end is connected to the anode of the diode 111. An end of the current-dividing coil 109z is connected to the anode of the diode 112. The other end is connected to the anode of the diode 113.

The cathode of the diode 110 is connected to the node a1 and, via the smoothing capacitor 108a, to the negative terminal of the input power supply Vin. Similarly, the cathode of the diode 111 is connected to the node b1 and, via the smoothing capacitor 108b, to the negative terminal of the input power supply Vin. The cathode of the diode 112 is connected to the node c1 and, via the smoothing capacitor 108c, to the negative terminal of the input power supply Vin. The cathode of the diode 113 is connected to the node d1, and via the smoothing capacitor 108d, to the negative terminal of the input power supply Vin.

Further, the node a2 is connected to a current feedback input of the PWM control IC 104 and, via the resistor R2, to the negative terminal of the input power supply Vin. The nodes b2, c2, and d2 are connected to the negative terminal of the input power supply Vin. Accordingly, the LED circuits 103a to 103d are connected in parallel between the center tap of the current-dividing coil 109x and the negative terminal of the input power supply Vin.

Where the ratio of the turns of the two windings in each current-dividing coil (109x, 109y, 109z) is 1:1, the ratio of the current flow, IF1, through the diode 110, the current flow, IF2, through the diode 111, the current flow, IF3, through the diode 112, and the current flow, IF4, through the diode 113 is 1:1:1:1. That is, current flows through 4 branches are equalized. To provide more branches, current flows through 8 branches are equalized, for example, by coupling each output of the current-dividing coils 109y and 109z to two current-dividing coils (a center tap of the coils). Further increasing the current-dividing coils in the same manner gives even more branches. The diode 106 may be omitted from the LED drive circuit 102.

Figure 5:
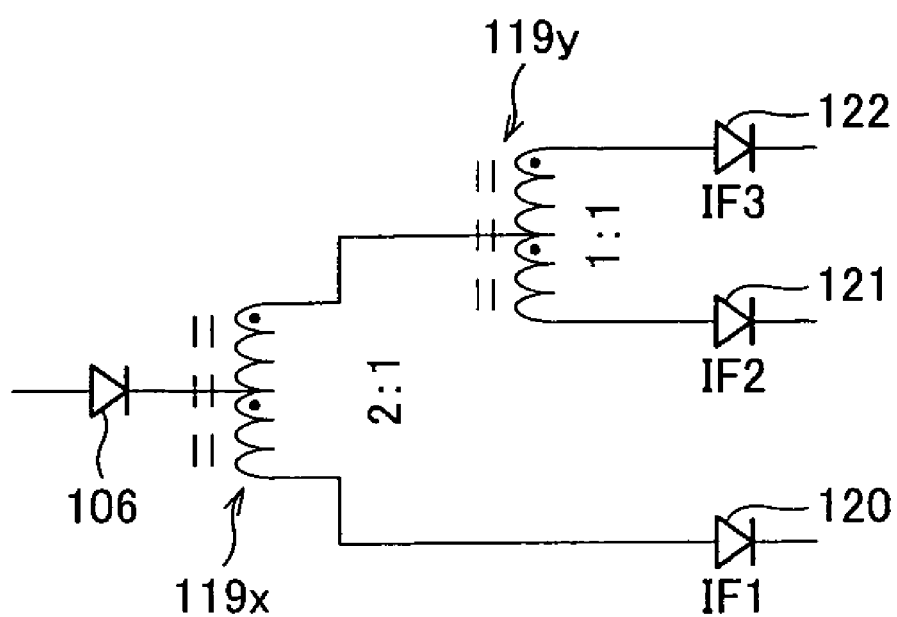
FIG. 5 is a circuit diagram illustrating a variation for a current-dividing circuit in the LED lighting device.

FIG. 5 shows an alternative including two current-dividing coils 119x and 119y. Where the ratio of the turns of the current-dividing coil 119x is 2:1, and the ratio of the turns of the current-dividing coil 119y is 1:1, the ratio of the current flow, IF1, through the diode 120, the current flow, IF2, through the diode 121, and the current flow, IF3, through the diode 122 is 1:1:1. That is, current flows through 3 branches are equalized.

Embodiment 3

Figure 6:
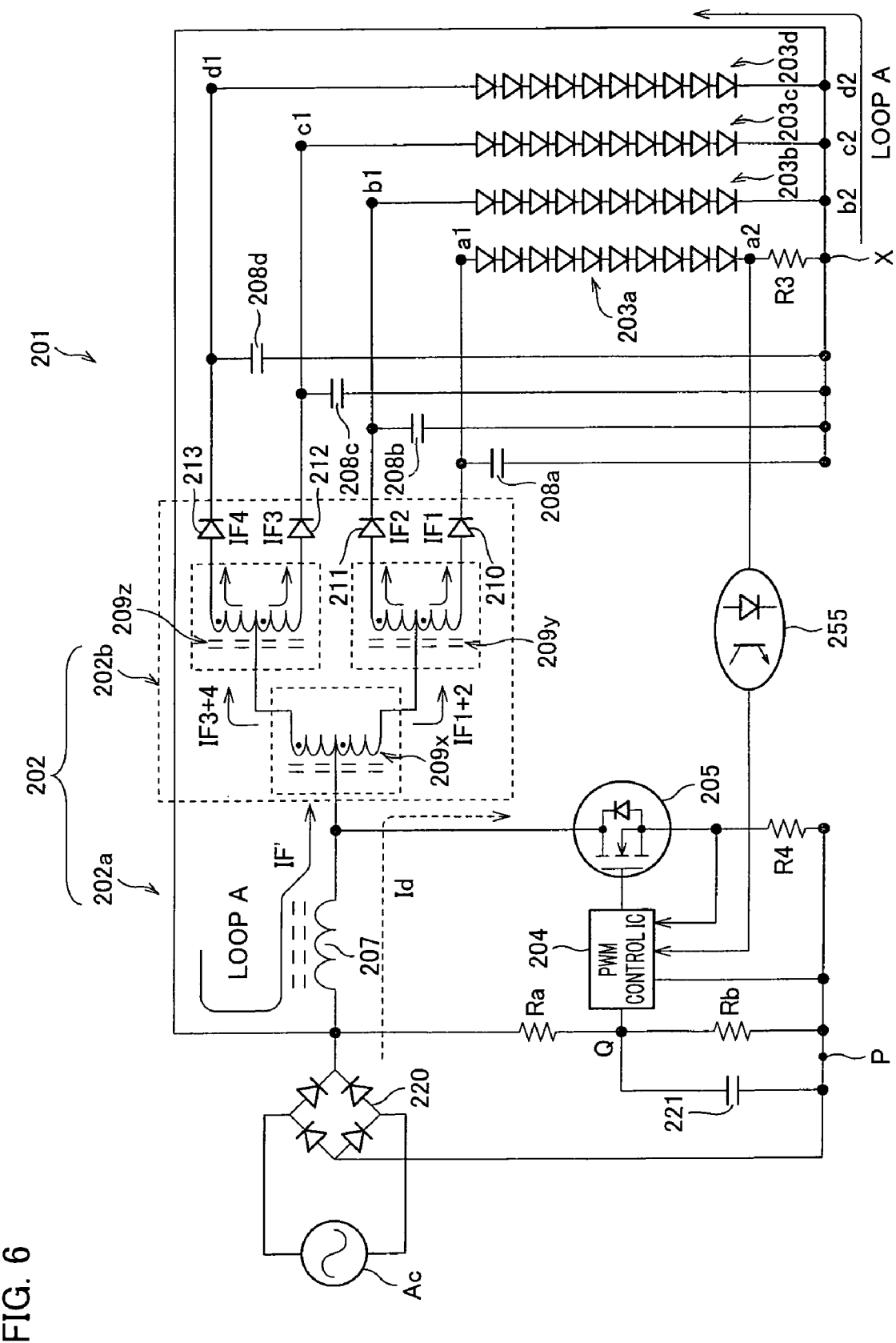
FIG. 6 is a circuit diagram illustrating the circuit arrangement of an LED lighting device for embodiment 3.

The following will describe another embodiment of the LED drive circuit of the present invention. FIG. 6 is a circuit diagram illustrating the arrangement of an LED lighting device for embodiment 3.

As shown in the figure, the LED lighting device 201 contains an AC power supply, an LED drive circuit 202, and four LED circuits 203a to 203d. The LED drive circuit 202 contains a switchable power supply circuit 202a and a current-dividing circuit 202b. The switchable power supply circuit 202a, connected to the AC power supply, contains bridged diodes 220, a capacitor 221, resistors Ra and Rb, a PWM control IC 204, a switching element 205 (N-channel MOS transistor), a coil 207 (with a core), smoothing capacitors 208a to 208d, a photocoupler 255 (for both emission and receipt of light), and resistors R3 and R4. The current-dividing circuit 202b contains current-dividing coils 209x to 209z and diodes 210 to 213 (reverse current blocking diodes). The current-dividing coils 209x to 209z are each made up of two windings wound around the same core which are coupled together at a center tap. The LED circuit 203a is made up of 10 LEDs connected in series between a node a1 and a node a2. Similarly, the LED circuit 203b is made up of 10 LEDs connected in series between a node b1 and a node b2. The LED circuit 203c is made up of 10 LEDs connected in series between a node c1 and a node c2. The LED circuit 203d is made up of 10 LEDs connected in series between a node d1 and a node d2.

In the LED drive circuit 202, the input terminals of the bridged diodes 220 are connected to the AC power supply. The positive terminal of the bridged diodes 220 is connected to an end of the coil 207. The other end of the coil 207, the first conductive terminal (drain) of the switching element 205, and the center tap of the current-dividing coil 209x are connected to each other. The control terminal (gate) of the switching element 205 is connected to the PWM control IC 204. The second conductive terminal (source) is connected to a current feedback input of the PWM control IC 204, and via the resistor R4, to the node P which in turn is connected to the negative terminal of the bridged diodes 220. Further, the positive terminal of the bridged diodes 220 is connected to the node Q via the resistor Ra. The resistor Rb and the capacitor 221 are connected in parallel between the nodes P and Q. The nodes P and Q are connected also to the PWM control IC 204.

An end of the current-dividing coil 209x is connected the center tap of the coil 209y. The other end is connected to the center tap of the coil 209z. An end of the current-dividing coil 209y is connected the anode of the diode 210. The other end is connected to the anode of the diode 211. An end of the current-dividing coil 209z is connected to the anode of the diode 212. The other end is connected to the anode of the diode 213.

The cathode of the diode 210 is connected to the node a1, and via the smoothing capacitor 208a, to the node x. Similarly, the cathode of the diode 211 is connected to the node b1, and via the smoothing capacitor 208b, to the node x. The cathode of the diode 212 is connected to the node c1, and via the smoothing capacitor 208c, to the node x. The cathode of the diode 213 is connected to the node d1, and via the smoothing capacitor 208d to the node x.

The node a2 is connected also to the current feedback input of the PWM control IC 204 via the photocoupler 255 and to the node x via the resistor R3. The nodes b2, c2, and d2 are all connected to the node x. The node x is connected to an end of the coil 207 and the positive terminal of the bridged diodes 220.

In the LED lighting device 201 of the present embodiment, the power output from the AC power supply is rectified by the bridged diodes 220. The rectified output voltage is directly switched by the switching element 205. Only that energy which is accumulated in the coil 207 while the switching element 205 is on is fed via the current loop A to the current-dividing circuit 202b (hence the LED circuits 203a to 203d) while the switching element 205 is off.

In the arrangement, the step-up circuit (current source) and the load (current-dividing circuits 209x to 209z and LED circuits 203a to 203d) do not share common GND (the AC power supply and the load are not connected in parallel). The current feedback to the PWM control IC 204 is provided by the photocoupler 255. Accordingly, the loop A in the figure can feed the current through the load back to the input of the coil 207 which accumulates step-up energy. Only the step-up energy can be supplied to the load side.

Therefore, even if the smoothing capacitors 208a to 208d or the LED circuits 203a to 203d are short-circuited and break down, only the energy accumulated in the coil 207 is supplied to maintain current at a constant value. This prevents problems like excess short-circuit current from the AC power supply which otherwise would cause smoke and wire pattern burnout. Safety design of the device is hence improved.

Embodiment 4

Figure 7:
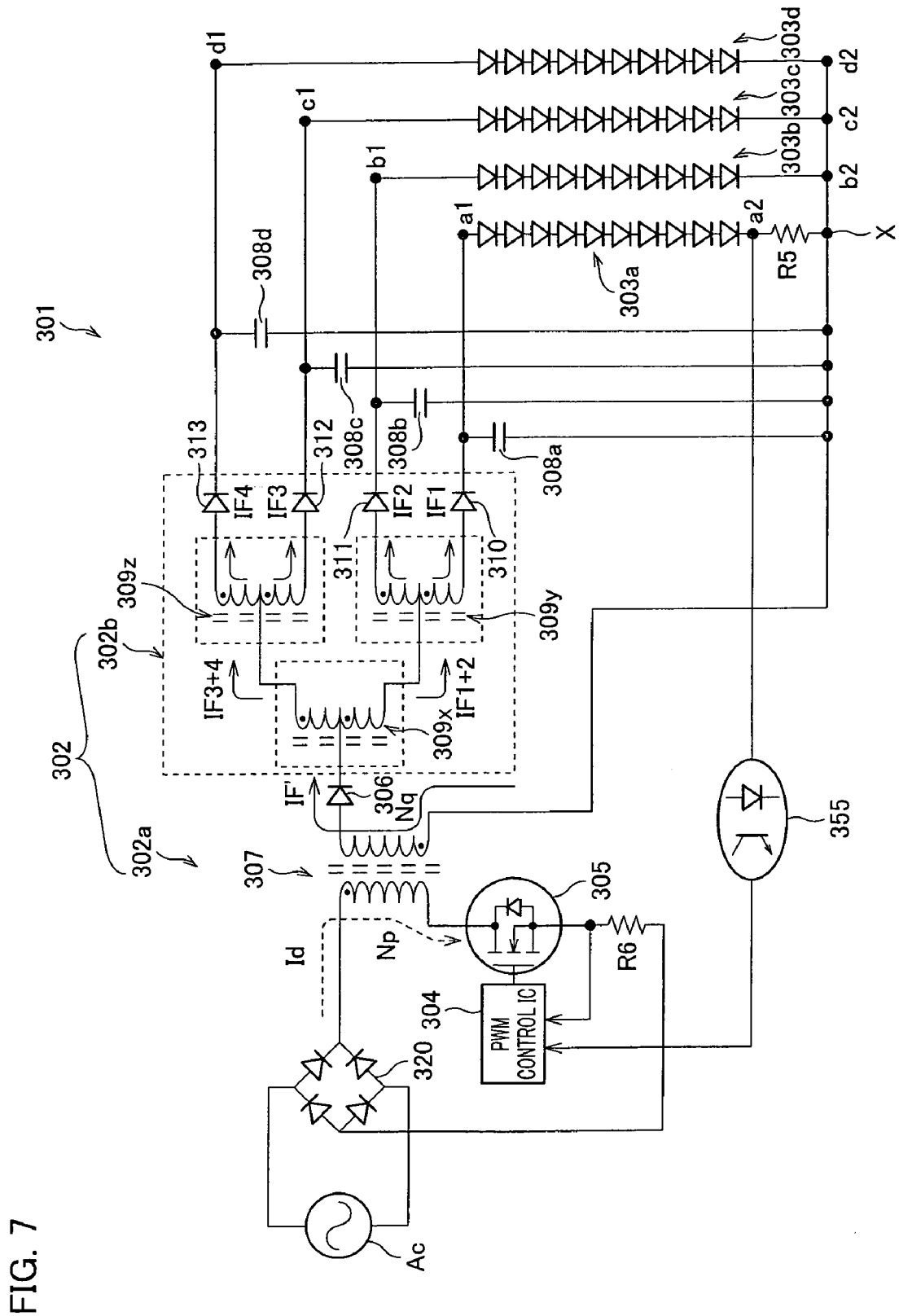
FIG. 7 is a circuit diagram illustrating the circuit arrangement of an LED lighting device for embodiment 4.

The following will describe another embodiment of the LED drive circuit of the present invention. FIG. 7 is a circuit diagram illustrating the arrangement of an LED lighting device for embodiment 4.

As shown in the figure, the LED lighting device 301 contains an AC power supply, an LED drive circuit 302, and four LED circuits 303a to 303d. The LED drive circuit 302 contains a switchable power supply circuit 302a and a current-dividing circuit 302b. The switchable power supply circuit 302a, connected to the AC power supply, contains bridged diodes 320, a PWM control IC 304, a switching element 305, a transformer 307 of windings Np and Nq, a diode 306, smoothing capacitors 308a to 308d, a photocoupler 355 (for both emission and receipt of light), and resistors R5 and R6. The current-dividing circuit 302b contains current-dividing coils 309x to 309z and diodes 310 to 313 (reverse current blocking diodes). The current-dividing coils 309x to 309z are each made up of two windings wound around the same core which are coupled together at a center tap. The LED circuit 303a is made up of 10 LEDs connected in series between a node a1 and a node a2. Similarly, the LED circuit 303b is made up of 10 LEDs connected in series between a node b1 and a node b2. The LED circuit 303c is made up of 10 LEDs connected in series between a node c1 and a node c2. The LED circuit 303d is made up of 10 LEDs connected in series between a node d1 and a node d2.

In the LED drive circuit 302, the input terminals of the bridged diodes 320 are connected to the AC power supply. The positive terminal of the bridged diodes 320 is connected to an end of the winding Np. The other end of the winding Np is connected the first conductive terminal (drain) of the switching element 305. The control terminal (gate) of the switching element 305 is connected to the PWM control IC 304. The second conductive terminal (source) is connected to a current feedback input of the PWM control IC 304, and via the resistor R6, to the negative terminal of the bridged diodes 320.

An end of the winding Nq is connected to the center tap of the current-dividing coil 309x via the diode 306. The other end is connected to the node x. An end of the current-dividing coil 309x is connected to the center tap of the coil 309y. The other end is connected to the center tap of the coil 309z. An end of the current-dividing coil 309y is connected to the anode of the diode 310. The other end is connected to the anode of the diode 311. An end of the current-dividing coil 309z is connected to the anode of the diode 312. The other end is connected to the anode of the diode 313.

The cathode of the diode 310 is connected to the node a1, and via the smoothing capacitor 308a, to the node x. Similarly, the cathode of the diode 311 is connected to the node b1, and via the smoothing capacitor 308b, to the node x. The cathode of the diode 312 is connected to the node c1, and via the smoothing capacitor 308c, to the node x. The cathode of the diode 313 is connected to the node d1, and via the smoothing capacitor 308d, to the node x.

The node a2 is connected also to a current feedback input of the PWM control IC 304 via the photocoupler 355 and to the node x via the resistor R5. The nodes b2, c2, and d2 are all connected to the node x.

In the LED lighting device 301 of the present embodiment, the power output from the AC power supply is full-wave rectified by the bridged diodes 320. The full-wave rectified output voltage is applied to the Np winding of the transformer 307, while the switching element 305 being switched on/off. In other words, a primary current Id is passed to the Np winding to accumulate energy while the switching element 305 is on. As the element 305 goes off, the energy accumulated in the Np winding generates induced electromotive force in the Ns winding. The current generated by the induced electromotive force is rectified by the diode 306 and fed to the center tap of the current-dividing coil 309x as a secondary current IF'. The current is then divided into IF1+2 and IF3+4 by the current-dividing coil 309x. The divided currents are fed to current-dividing coils 309y, 309z, and again divided into IF1, 2 and IF3, 4, respectively, which are fed to the smoothing capacitors 308a to 308d and the LED circuits 303a to 303d.

The current flow through the LED circuit 303a is detected using R5 for a feedback to the PWM control IC 304 on the primary side via the photocoupler 355. Accordingly, current is maintained at a constant value of IF'=(IF1+IF2+IF3+IF4). The secondary current IF' occurs every time the switching element 305 is switched off, and decays with time as is the case with FIG. 2. Electromagnetic induction thus occurs in the current-dividing coil. The current-dividing circuit of the present invention (circuit including the current-dividing coil and the reverse current blocking diode) can be applied.

The energy accumulated through an insulating converter is output to the secondary side. The AC power supply and the load are therefore not connected in parallel. Thus, even if the smoothing capacitors 308a to 308d or the LED circuits 303a to 303d become short-circuited, break down or malfunction, excess current does not flow. The device is extra safe. The insulating converter may contain one transistor as shown in FIG. 7 or two or more transistors.

Embodiment 5

Figure 8:
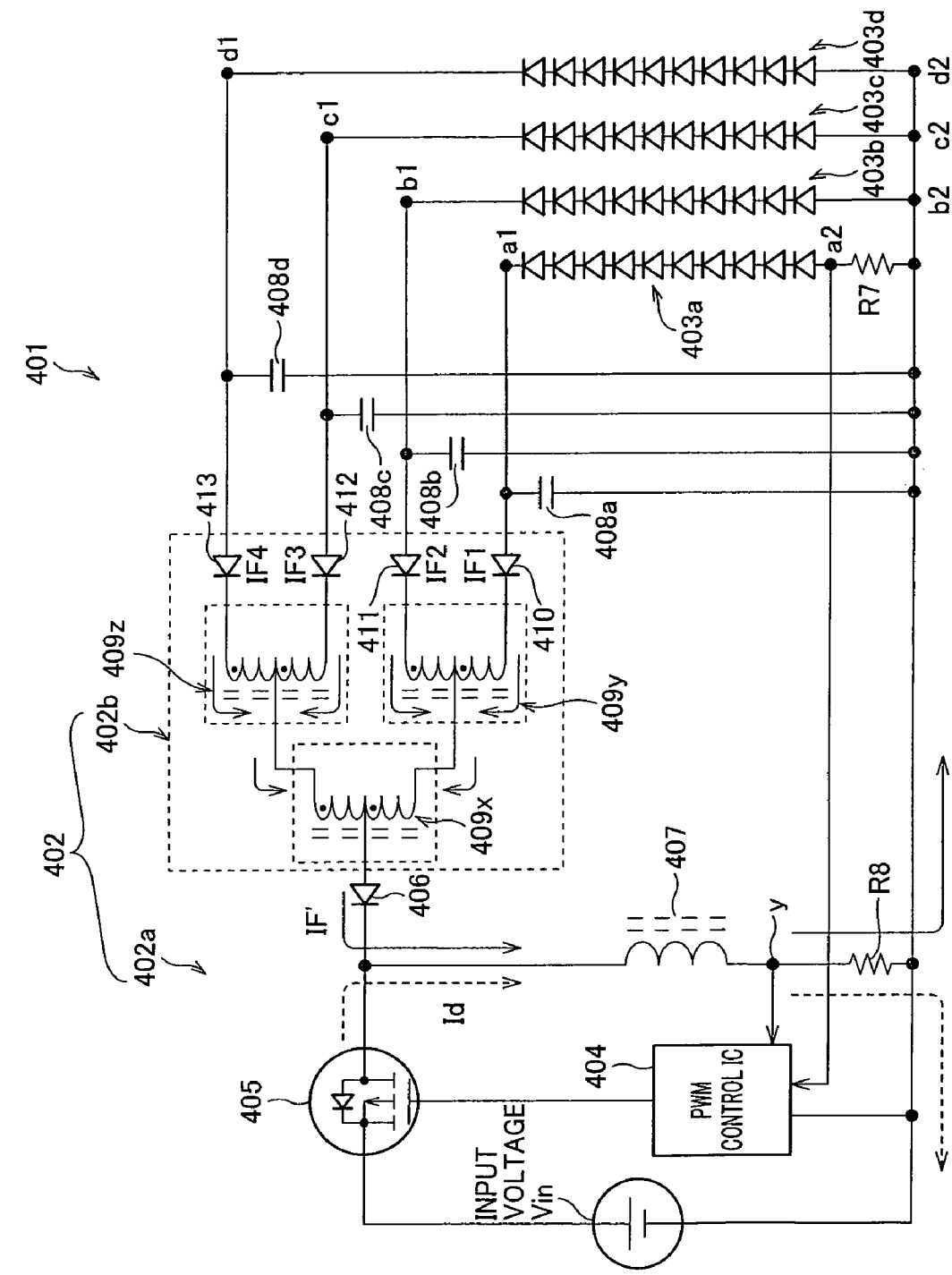
FIG. 8 is a circuit diagram illustrating the circuit arrangement of an LED lighting device for embodiment 5.
Figure 9:
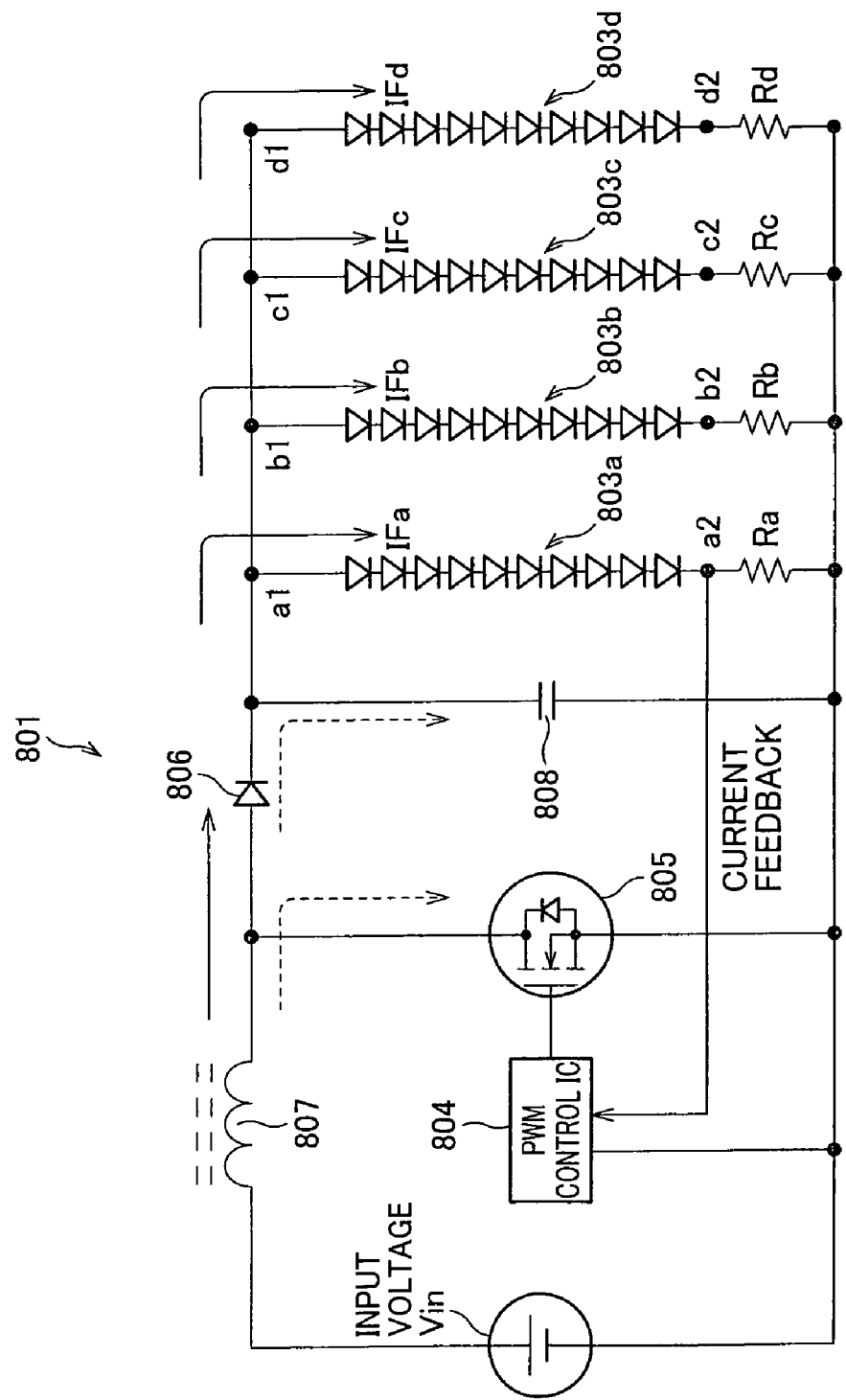
FIG. 9 is a circuit diagram illustrating the circuit arrangement of a conventional LED lighting device.
Figure 10:
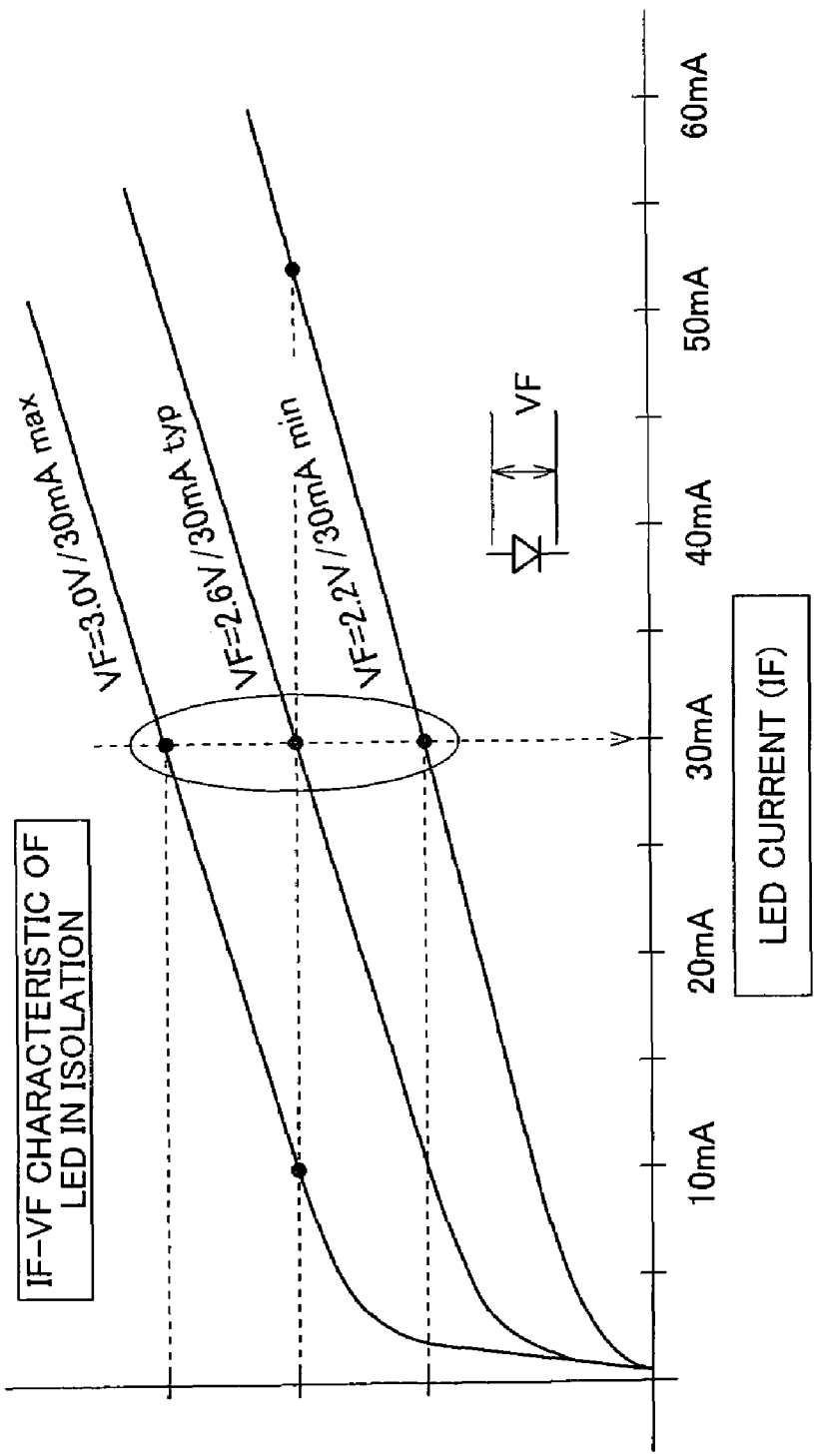
FIG. 10 is a graphical representation of the forward current-forward voltage characteristic (IF-VF characteristic) of an LED.
Figure 11:
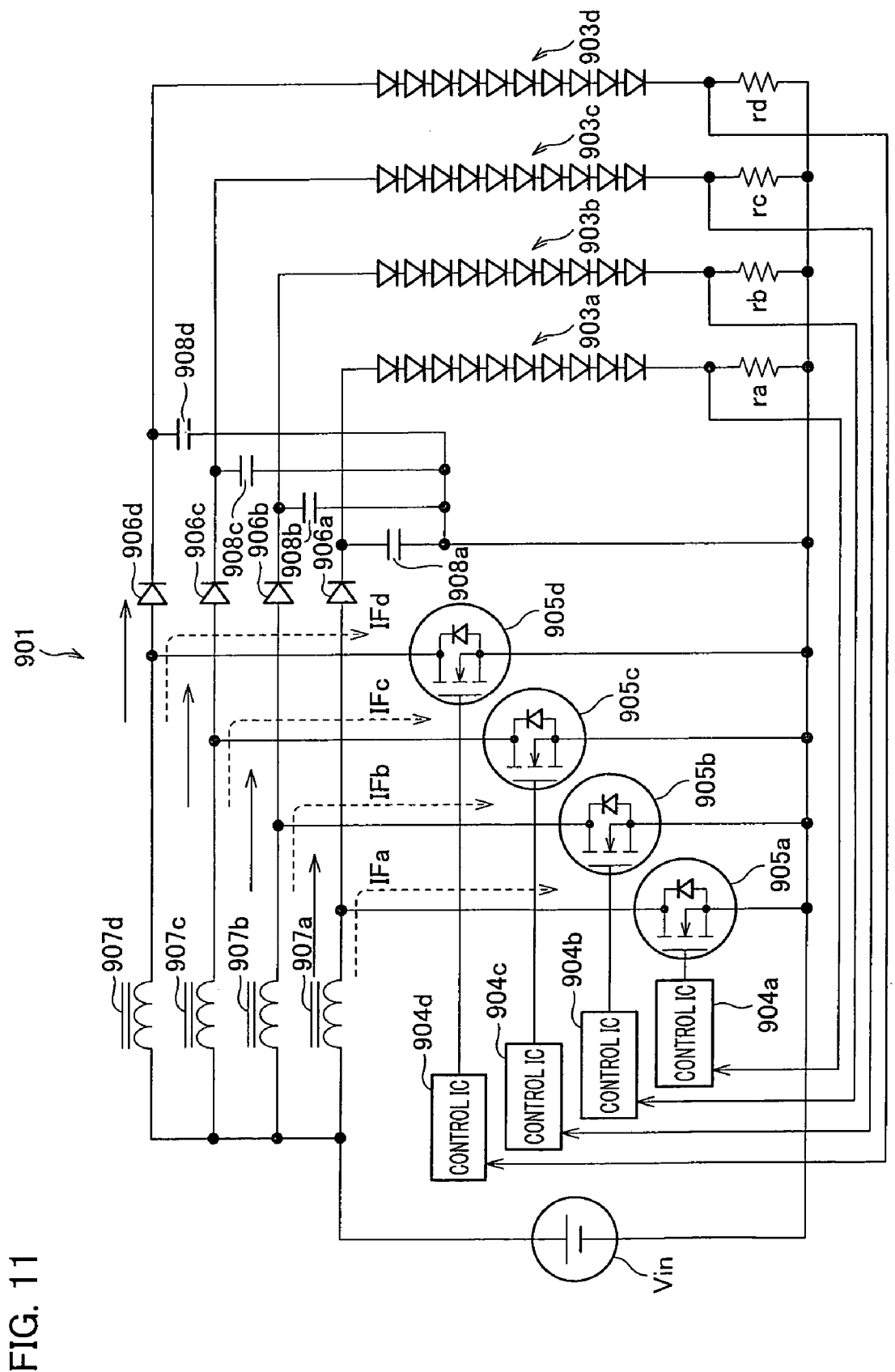
FIG. 11 is a circuit diagram illustrating the circuit arrangement of another conventional LED lighting device.

The following will describe another embodiment of the LED drive circuit of the present invention. FIG. 8 is a circuit diagram illustrating the arrangement of an LED lighting device for embodiment 5.

As shown in the figure, the LED lighting device 401 contains a (DC) input power supply Vin, an LED drive circuit 402, and four LED circuits 403a to 403d. The LED drive circuit 402 contains a switchable power supply circuit 402a and a current-dividing circuit 402b. The switchable power supply circuit 402a, connected to the input power supply Vin, contains a PWM control IC 404, a switching element 405 (P-channel MOS transistor), a diode 406, a coil 407, smoothing capacitors 408a to 408d, and resistors R7 and R8. The current-dividing circuit 402b contains current-dividing coils 409x to 409z and diodes 410 to 413 (reverse current blocking diodes). The current-dividing coils 409x to 409z are each made up of two windings wound around the same core which are coupled together at a center tap. The LED circuit 403a is made up of 10 LEDs connected in series between a node a1 and a node a2. Similarly, the LED circuit 403b is made up of 10 LEDs connected in series between a node b1 and a node b2. The LED circuit 403c is made up of 10 LEDs connected in series between a node c1 and a node c2. The LED circuit 403d is made up of 10 LEDs connected in series between a node d1 and a node d2.

In the LED drive circuit 402, the first conductive terminal (source) of the switching element 405 is connected to the positive terminal of the input power supply Vin. The second conductive terminal (drain) of the switching element 405, the cathode of the diode 406, and an end of the coil 407 are connected to each other. The other end of the coil 407 is connected to a node y. The node y is connected to a feedback input of the PWM control IC 404, and via the resistor R7, to the negative terminal of the input power supply Vin. In addition, the control terminal (gate) of the switching element 405 is connected to the PWM control IC 404.

The anode of the diode 406 is connected to the center tap of the current-dividing coil 409x. An end of the current-dividing coil 409x is connected to the center tap of the coil 409y. The other end is connected to the center tap of the coil 409z. An end of the current-dividing coil 409y is connected to the cathode of the diode 410. The other end is connected to the cathode of the diode 411. An end of the current-dividing coil 409z is connected to the cathode of the diode 412. The other end is connected to the cathode of the diode 413.

The anode of the diode 410 is connected to the node a1, and via the smoothing capacitor 408a, to the negative terminal of the input power supply Vin. Similarly, the anode of the diode 411 is connected to the node b1, and via the smoothing capacitor 408b, to the negative terminal of the input power supply Vin. The anode of the diode 412 is connected to the node c1, and via the smoothing capacitor 408c, to the negative terminal of the input power supply Vin. The anode of the diode 413 is connected to the node d1, and via the smoothing capacitor 408d, to the negative terminal of the input power supply Vin.

The node a2 is also connected to a current feedback input of the PWM control IC 404, and via the resistor R7, to the negative terminal of the input power supply Vin. The PWM control IC 404 and the nodes b2, c2, and d2 are also connected to the negative terminal of the input power supply Vin. Accordingly, the LED circuits 403a to 403d are connected in parallel between a tap of the current-dividing coil 409x and the negative terminal of the input power supply Vin.

The LED drive circuit 402 of the present embodiment is an inverted chopper circuit with the current-dividing coils 409x to 409z and the reverse current blocking diodes 410 to 413 being added. While the switching element 405 is on, the coil 407 accumulates energy from Id indicated in dashed line from the input voltage Vin. The diode 406 or diodes 410 to 413 obstruct current flow to the load side. No current flows to the load side. Next, as the switching element 405 switches off, Id is stopped from flowing to the coil 407. The accumulated energy keeps flowing through the IF' loop, thereby being discharged to the load. The current IF' also decays with time. By inserting the current-dividing coils 409x to 409z and the reverse current blocking diodes 410 to 413 along the current loop, equal currents flow to the LED circuits 403a to 403d. The operating principles of the present circuit are similar to those in embodiment 4 (see FIG. 7). The transformer 307 in FIG. 7 is however replaced with the coil 407 in FIG. 8. The two circuits differ from each other in that negative voltage is applied to the load in the present circuit.

The diode 406 intervenes between the input voltage Vin and the LED circuits 403a to 403d. Further, the input voltage Vin and the LED circuits 403a to 403d are not connected in parallel. Therefore, even if the smoothing capacitors 408a to 408d or the LED circuits 403a to 403d become short-circuited, break down or malfunction, excess current does not flow. The device is extra safe.

According to the embodiments, even if the parallel LEDs have different IF-VF characteristics, the operation of the current-dividing circuit enables equal division of current. The LED circuits receive an equal constant current or desired current. The intensities of emitted light can be equalized. Accordingly, the area light source exhibits uniform brightness. In addition, currents are made constant and equal to each other; unlike conventional techniques, there is no need for constant current control for each LED circuit. Circuits are thus simple and low cost. This mechanism equalizes currents even when LEDs of different IF-VF characteristics are involved or different numbers of LEDs are connected in series. Circuits are designed more freely. The mechanism, unlike conventional schemes, does not allow excess current to flow through low-VF LED or local temperature rises and lifetime cuts due to VF×IF heating. Stable properties are thus obtained in terms of reliability. Further, in embodiments 3 and 4, even if the LEDs become short-circuited and break one by one over a long period, constant currents are fed to the lines, maintaining a balance. No abnormal current due to short circuit flows. Stability of the apparatus is guaranteed.

The LED drive circuits of the embodiments (1 to 5) are applicable to drive LEDs in a so-called hybrid LED lighting which involves both a discharge tube and LEDs.

As described in the foregoing, according to the present invention, the temporally altering current generated in the current source flows into the current-dividing coil. This cause inductive coupling in the current-dividing coil to occur, dividing the incoming current from the current source at the inverse of the ratio of the numbers of turns of the two windings, regardless of the forward current-forward voltage characteristics of the first and second LED circuits. The divided currents are fed via the reverse current blocking diodes to the smoothing capacitors and the LED circuits connected in parallel. Accordingly, even if the LED circuits have different forward current-forward voltage characteristics, a desired current (for example, equal current) is fed to the LED circuits. The arrangements thus addresses variations in light intensity (luminance level) between the LED circuits. The arrangement also addresses different temperature rises and lifetimes due to different current values. The arrangement is simple and delivers high quality products at low manufacturing cost.

The LED drive circuit of the present invention contains a current source generating a temporally altering current and a first to a fourth smoothing capacitor. The drive circuit drives: a first LED circuit, containing one LED or series-connected LEDs, which is connected in parallel with the first smoothing capacitor; a second LED circuit, containing one LED or series-connected LEDs, which is connected in parallel with the second smoothing capacitor; a third LED circuit, containing one LED or series-connected LEDs, which is connected in parallel with the third smoothing capacitor; and a fourth LED circuit, containing one LED or series-connected LEDs, which is connected in parallel with the fourth smoothing capacitor. The drive circuit includes: a first current-dividing coil containing two coils coupled at a tap to which the current source is also coupled; a second current-dividing coil containing two coils coupled at a tap to which an end of the first current-dividing coil is also coupled; a third current-dividing coil containing two coils coupled at a tap to which another end of the first current-dividing coil is also coupled; a first reverse current blocking diode connected between an end of the second current-dividing coil and an electrode of the first smoothing capacitor; a second reverse current blocking diode connected between another end of the second current-dividing coil and an electrode of the second smoothing capacitor; a third reverse current blocking diode connected between an end of the third current-dividing coil and an electrode of the third smoothing capacitor; and a fourth reverse current blocking diode connected to another end of the third current-dividing coil and an electrode of the fourth smoothing capacitor.

Using the current-dividing coils as in the arrangement enables driving of numerous (3 or more) LED circuits.

The LED drive circuit of the present invention contains a current source generating a temporally altering current and a first to a third smoothing capacitor. The drive circuit drives: a first LED circuit, containing one LED or series-connected LEDs, which is connected in parallel with the first smoothing capacitor; a second LED circuit, containing one LED or series-connected LEDs, which is connected in parallel with the second smoothing capacitor; and a third LED circuit, containing one LED or series-connected LEDs, which is connected in parallel with the third smoothing capacitor. The drive circuit includes: first current-dividing coil containing two coils coupled at a tap to which the current source is also coupled; a second current-dividing coil containing two coils coupled at a tap to which an end of the first current-dividing coil is coupled; a first reverse current blocking diode connected between an end of the second current-dividing coil and an electrode of the first smoothing capacitor; a second reverse current blocking diode connected between another end of the second current-dividing coil and an electrode of the second smoothing capacitor; and a third reverse current blocking diode connected between another end of the first current-dividing coil and an electrode of the third smoothing capacitor.

Two current-dividing coils may be used in this manner. An end of one of the current-dividing coils is connected to a tap of the other current-dividing coil. The other end is connected to the reverse current blocking diode. Three LED circuits can be driven.

The LED drive circuit may be arranged so that the current source is a switchable current source containing: a coil connected to a DC power supply; a switching element connected to the coil; and a control circuit controlling closure/opening of the switching element according to a current through the first LED circuit.

The LED drive circuit may be arranged so that: the current source is electrically insulated from the LED circuits; and the current flow through the first LED circuit is fed back via a photocoupler (detected by a detecting circuit including a photocoupler). By electrically insulating the current source from the LED circuits in this manner, even if the smoothing capacitor and the LED circuits are short-circuited and break down, abnormal current is prevented from flowing to the load side.

The LED drive circuit may be arranged so that: the current source is electrically insulated from the LED circuits; and the current source is a switchable current source containing: a transformer connected to an AC power supply via a rectifying circuit; a switching element connected to a primary winding of the transformer; and a control circuit feeding back a current through the first LED circuit via a photocoupler to control closure/opening of the switching element (detected by a detecting circuit including a photocoupler). By electrically insulating the current source from the LED circuits in this manner, even if the smoothing capacitor and the LED circuits are short-circuited and break down, abnormal current is prevented from flowing to the load side.

An LED lighting device of the present invention is characterized in that it includes the LED drive circuit.

A backlight of the present invention is characterized in that it includes the LED drive circuit.

The LED drive circuit in accordance with the present invention is widely applicable to liquid crystal backlight inverters in liquid crystal TVs and monitors, LED lighting devices, and LED applied devices.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An LED drive circuit including a current source generating a temporally altering current and a first smoothing capacitor and a second smoothing capacitor, the drive circuit driving: a first LED circuit, containing one LED or series-connected LEDs, which is connected in parallel with the first smoothing capacitor; and a second LED circuit, containing one LED or series-connected LEDs, which is connected in parallel with the second smoothing capacitor, the drive circuit comprising:
a current-dividing coil containing two coils coupled at a tap so that the current generated in the current source flows into the tap;
a first reverse current blocking diode connected between an end of the current-dividing coil and an electrode of the first smoothing capacitor; and
a second reverse current blocking diode connected between another end of the current-dividing coil and an electrode of the second smoothing capacitor.

2. The LED drive circuit of claim 1, wherein
the current source is a switchable current source containing: a coil connected to a DC power supply; a switching element connected to the coil; and a control circuit controlling closure/opening of the switching element according to a current through the first LED circuit.

3. The LED drive circuit of claim 2, wherein:
the current source is electrically insulated from the LED circuits; and
the current flow through the first LED circuit is fed back via a photocoupler.

4. The LED drive circuit of claim 1, wherein:
the current source is electrically insulated from the LED circuits; and
the current source is a switchable current source containing: a transformer connected to an AC power supply via a rectifying circuit; a switching element connected to a primary winding of the transformer; and a control circuit feeding back a current through the first LED circuit via a photocoupler to control closure/opening of the switching element.

5. An LED drive circuit including a current source generating a temporally altering current and a first to a fourth smoothing capacitor, the drive circuit driving: a first LED circuit, containing one LED or series-connected LEDs, which is connected in parallel with the first smoothing capacitor; a second LED circuit, containing one LED or series-connected LEDs, which is connected in parallel with the second smoothing capacitor; a third LED circuit, containing one LED or series-connected LEDs, which is connected in parallel with the third smoothing capacitor; and a fourth LED circuit, containing one LED or series-connected LEDs, which is connected in parallel with the fourth smoothing capacitor, the drive circuit comprising:
a first current-dividing coil containing two coils coupled at a tap to which the current source is also coupled;
a second current-dividing coil containing two coils coupled at a tap to which an end of the first current-dividing coil is also coupled;
a third current-dividing coil containing two coils coupled at a tap to which another end of the first current-dividing coil is also coupled;
a first reverse current blocking diode connected between an end of the second current-dividing coil and an electrode of the first smoothing capacitor;
a second reverse current blocking diode connected between another end of the second current-dividing coil and an electrode of the second smoothing capacitor;
a third reverse current blocking diode connected between an end of the third current-dividing coil and an electrode of the third smoothing capacitor; and a fourth reverse current blocking diode connected to another end of the third current-dividing coil and an electrode of the fourth smoothing capacitor.

6. An LED drive circuit including a current source generating a temporally altering current and a first to a third smoothing capacitor, the drive circuit driving: a first LED circuit, containing one LED or series-connected LEDs, which is connected in parallel with the first smoothing capacitor; a second LED circuit, containing one LED or series-connected LEDs, which is connected in parallel with the second smoothing capacitor; and a third LED circuit, containing one LED or series-connected LEDs, which is connected in parallel with the third smoothing capacitor, the drive circuit comprising:

first current-dividing coil containing two coils coupled at a tap to which the current source is also coupled;

a second current-dividing coil containing two coils coupled at a tap to which an end of the first current-dividing coil is coupled;

a first reverse current blocking diode connected between an end of the second current-dividing coil and an electrode of the first smoothing capacitor;

a second reverse current blocking diode connected between another end of the second current-dividing coil and an electrode of the second smoothing capacitor; and a third reverse current blocking diode connected between another end of the first current-dividing coil and an electrode of the third smoothing capacitor.

7. An LED lighting device including an LED drive circuit including a current source generating a temporally altering current and a first smoothing capacitor and a second smoothing capacitor, the drive circuit driving: a first LED circuit, containing one LED or series-connected LEDs, which is connected in parallel with the first smoothing capacitor; and a second LED circuit, containing one LED or series-connected LEDs, which is connected in parallel with the second smoothing capacitor, the drive circuit comprising: a current-dividing coil containing two coils coupled at a tap so that the current generated in the current source flows into the tap; a first reverse current blocking diode connected between an end of the current-dividing coil and an electrode of the first smoothing capacitor; and a second reverse current blocking diode connected between another end of the current-dividing coil and an electrode of the second smoothing capacitor.

8. A backlight including an LED drive circuit including a current source generating a temporally altering current and a first smoothing capacitor and a second smoothing capacitor, the drive circuit driving: a first LED circuit, containing one LED or series-connected LEDs, which is connected in parallel with the first smoothing capacitor; and a second LED circuit, containing one LED or series-connected LEDs, which is connected in parallel with the second smoothing capacitor, the drive circuit comprising: a current-dividing coil containing two coils coupled at a tap so that the current generated in the current source flows into the tap; a first reverse current blocking diode connected between an end of the current-dividing coil and an electrode of the first smoothing capacitor; and a second reverse current blocking diode connected between another end of the current-dividing coil and an electrode of the second smoothing capacitor.

* * * * *